No. 797,790. PATENTED AUG. 22, 1905.
E. M. CAFFALL.
MEANS FOR UTILIZING THE MOTIVE POWER OF MOTOR VEHICLES.
APPLICATION FILED OCT. 3, 1903.
3 SHEETS—SHEET 3.
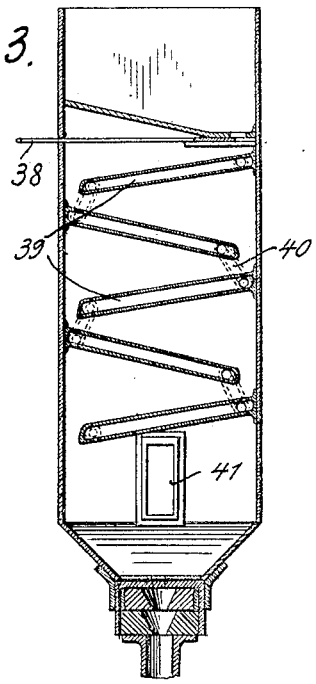
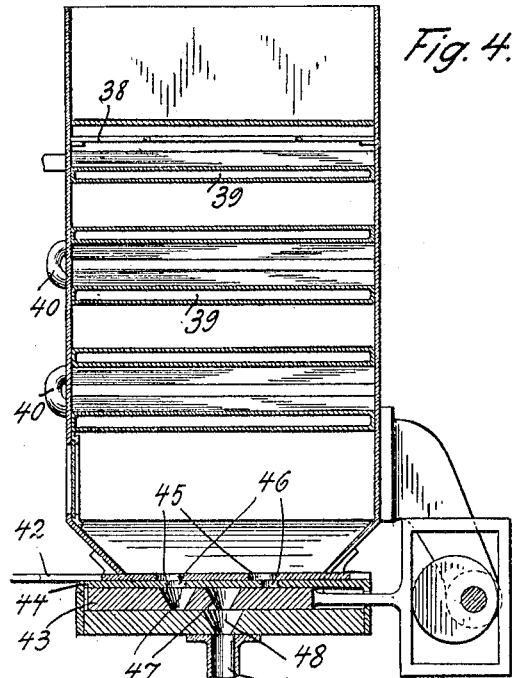
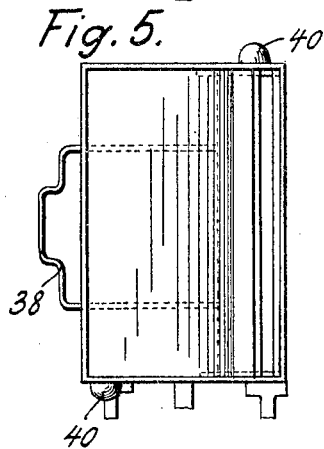
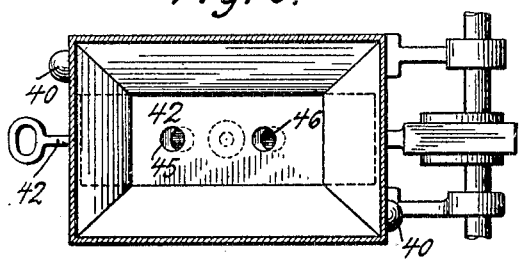
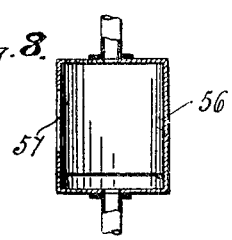
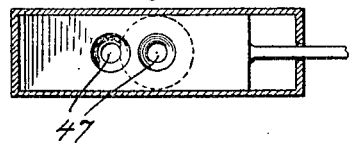
Witnesses
F. N. Roehrich
Edward W. Searing
Edward May Caffall
Inventor
By Attorney
L. D. Mayes

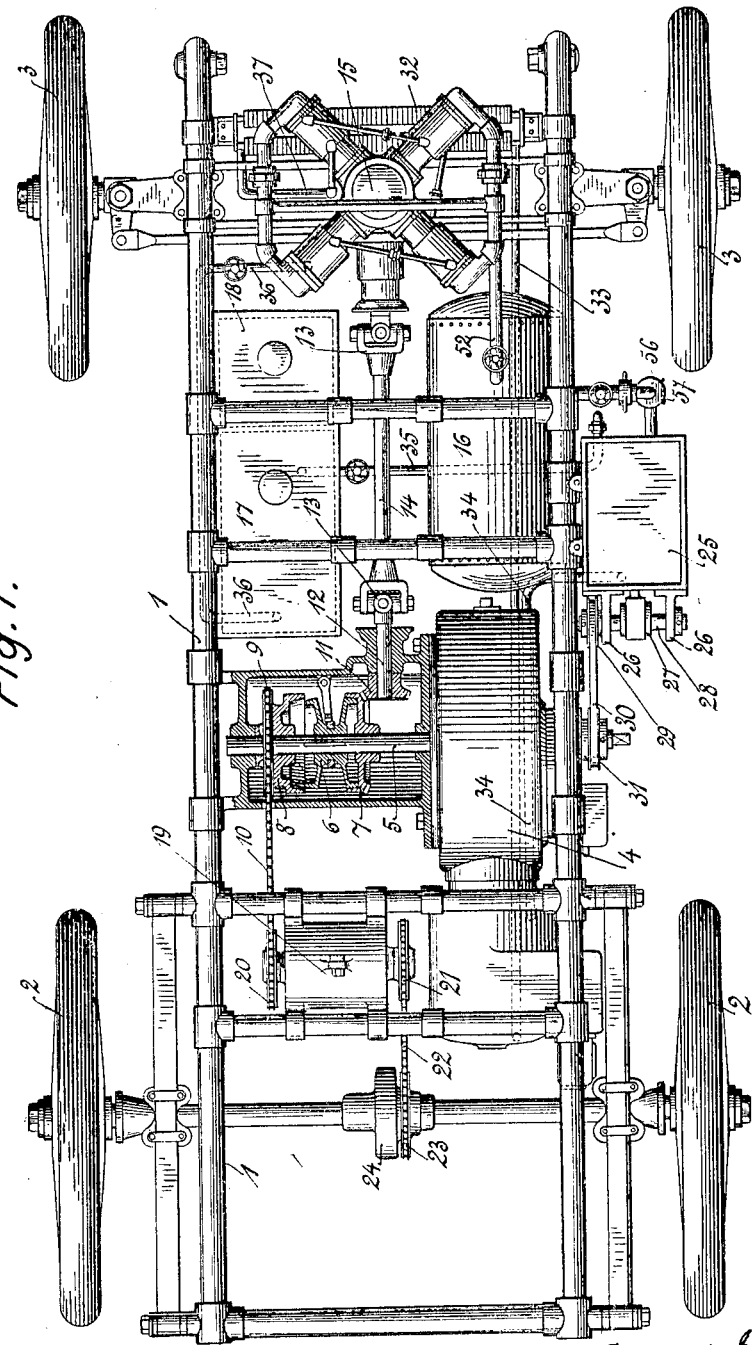

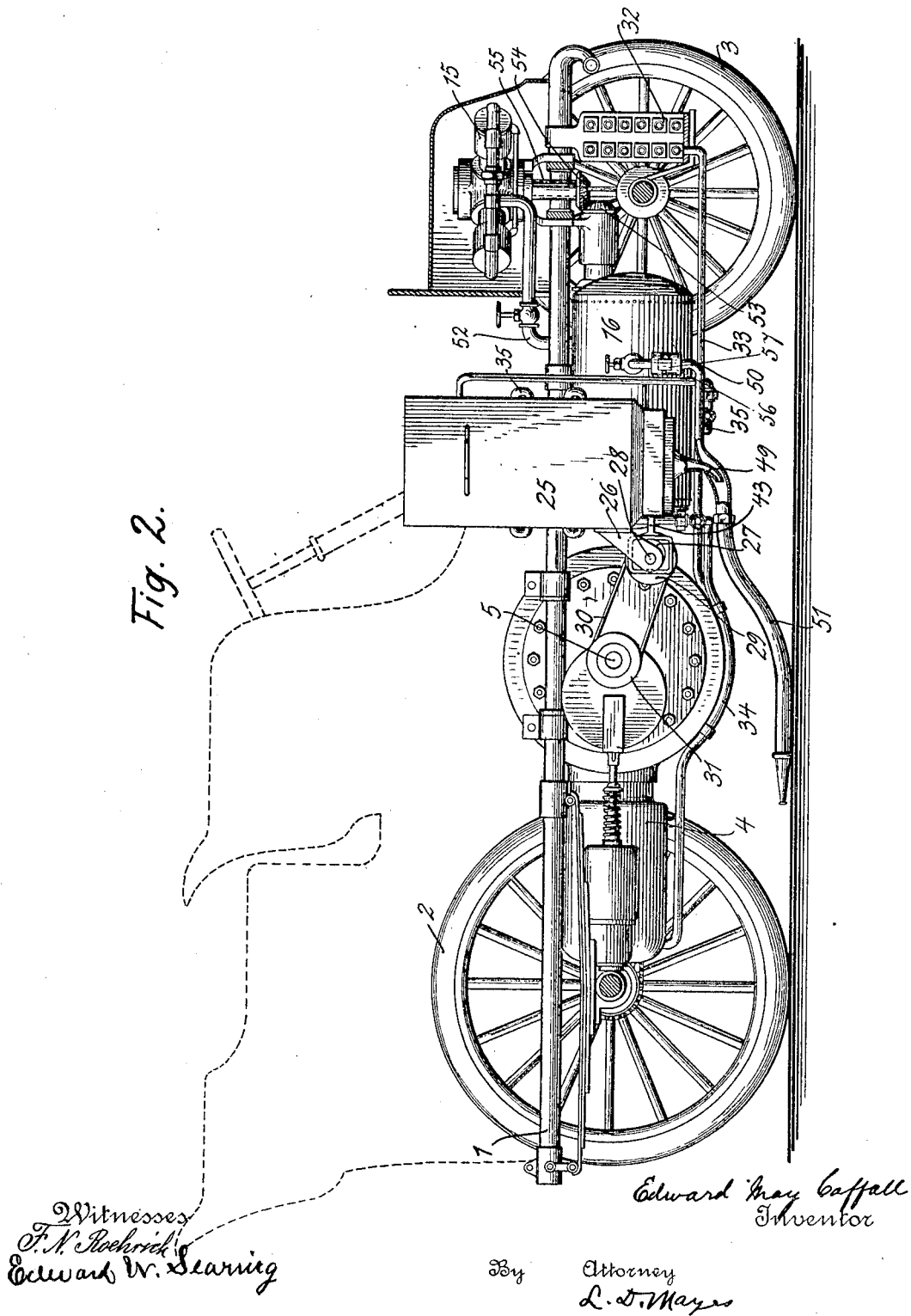

UNITED STATES PATENT OFFICE.

EDWARD MAY CAFFALL, OF SPARKILL, NEW YORK.

MEANS FOR UTILIZING THE MOTIVE POWER OF MOTOR-VEHICLES.

No. 797,790.         Specification of Letters Patent.         Patented Aug. 22, 1905.

Application filed October 3, 1903. Serial No. 175,645.

*To all whom it may concern:*

Be it known that I, EDWARD MAY CAFFALL, a citizen of the United States, residing at Sparkill, county of Rockland, and State of New York, have invented certain new and useful Improvements in Means for Utilizing the Motive Power of Motor-Vehicles, of which the following is a specification.

The object of the present invention is to provide a motor-vehicle of any well-known type, whether operated by steam, gasolene, electricity, or other motive power, with means whereby the motor of said vehicle when not used for traction purposes may be utilized to compress air to furnish power for operating pneumatic tools, sand-blasting, fire-extinguishing, spraying trees, paint-spraying, waterproofing surfaces, pumping water, and other purposes which will readily suggest themselves.

The essential feature of the invention resides in the combination, with the motor-shaft, of power-transmitting means which may be shifted so as to either propel the vehicle or to operate an air-compressor and its accessories carried by the vehicle for the purposes above stated.

By means of my invention I am enabled to equip a motor-vehicle in a convenient and compact manner with the tools and appliances necessary for the operations above indicated and to make the same readily available upon being transported to the place of use.

I have not deemed it necessary to illustrate and describe all the capabilities of use to which my invention is adapted. Therefore in the accompanying drawings I have shown but one embodiment of my invention, selecting for the purpose of illustration the application to a sand-blast apparatus, it being understood that the specific details of construction either in the power-transmitting means or in the means necessary for the utilization of the air-blast for various purposes may be varied without departing from the principle of my invention.

The invention will be understood by reference to the accompanying drawings, in which—

Figure 1 is a top view of the frame of the vehicle and parts supported by it, certain parts being shown in section. Fig. 2 is a side view thereof. Fig. 3 is a vertical sectional view of the sand-box. Fig. 4 is a vertical sectional view at right angles to that of Fig. 3. Fig. 5 is a top view of the sand-box. Figs. 6 and 7 are transverse sectional views thereof, and Fig. 8 a sectional view of the air-drying chamber.

Similar reference-numerals indicate similar parts in the several views.

In the drawings the numeral 1 designates the side-bars of the vehicle-frame secured together by cross-bars, said frame carrying the axles of the traction-wheels 2 and the front or steering wheels 3. The vehicle is provided with a speed changing or regulating device 19, by which the speed of the vehicle may be controlled. The motor 4 may be of any type in general use and drives a shaft 5, upon which is slidably mounted in the usual manner a friction or other form of clutch 6, adapted in one position to engage the hub 8 of a sprocket-wheel 9, loosely mounted on said shaft and by which motion is transmitted to the axle of the traction-wheels through sprocket-chains 10 and 22, sprocket-wheels 20, 21, and 23, and equalizer 24, all in a well-known manner.

Supported upon the frame of the vehicle is an air-compressor 15, of any desired construction, that shown being of the four-cylinder type and provided with the usual water-jacket. The air-compressor is driven by a connection with the motor-shaft, that shown in the drawings consisting of a shaft 14, having universal joints 13, connected through one of said joints with a short shaft 12, the latter having secured thereto a gear 11, which meshes with a gear-wheel 7, loosely mounted on the motor-shaft 5. At its forward end the shaft 14 carries a gear wheel or pinion 53, meshing with a gear-wheel 54, secured to the shaft 55 of the compressor. The clutch 6 is provided with any suitable means for shifting it into engagement either with the driving-wheel 9 to propel the vehicle or into engagement with the gear-wheel 7 to drive the shaft 14, and thereby actuate the air-compressor 15. Such shifting may be effected by a connection with the ordinary driving-lever. The clutch mechanism is made so that the clutch may be thrown out of engagement with both the driven members 7 and 9, so that no work may be performed thereby, the shaft 5 in such case running free.

The compressed air may be utilized for various purposes, some of which have been indicated above, and one practical adaptation will now be so described. For the purpose of illustration I have shown a sand-blast apparatus, and for such purpose it is desirable to provide an air-reservoir 16, the air from the compressor being conducted thereto by a pipe 52. A pipe 50 leads from the reservoir 16, and into said pipe is led the discharge-tube 49 from a sand box or hopper 25, the air producing a partial vacuum in the sand-tube which it incloses. On opening a valve in the bottom of the sand-box 25 a stream of sand is drawn through the tube into the jet of air and is forced by it through the nozzle-tube 51 to be used in a well-known manner.

In connection with the present apparatus I have shown a specific form of sand-box having an inclined floor 25' in the upper part to deliver the sand through an outlet 26', controlled by a gate 38, extending outside of the box and adapted to be manually operated to open or close said outlet. Extending alternately from opposite side walls of the box 25 are downwardly-inclined hollow shelves 39, preferably formed of sheet metal, said shelves permitting a continuous flow of sand downward. The interiors of the shelves 39 are connected together by short return-pipes 40, the upper shelf having a pipe connection 35 with the water-reservoir 17 and the lower shelf having a pipe connection 34 with the water-jacket of the motor 4. By the system of water circulation hereinafter described the water admitted to the lower shelf by pipe 40 is heated, and as it traverses all the shelves to the outlet-pipe 35 the heat is sufficient to effectually dry the sand as the latter flows down over the shelves.

The box 25 is supported in any suitable manner upon the frame of the vehicle and has a fixed bottom plate 44, provided with two openings 46. Above the plate 44 is a slide-plate 42, having openings 45, adapted by the movement of said plate 42 by means of handle 42' to register with the openings 46, so as to open them more or less. Below the plate 44 is a fixed plate 48', having a central discharge-orifice 48 in communication with the sand-tube 49. Between the plates 44 and 48' is slidably mounted a feed-plate 43, having two or more sand-receptacles 47, open at top and bottom, said plate 43 adapted by its reciprocations to receive and then discharge a regulated quantity of sand. The plate 43 may be reciprocated in any convenient manner—as, for example, by a rod connecting with an eccentric 27, secured upon a shaft 28, having bearings in brackets 26, secured to the walls of the sand-box, said shaft being driven through pulley 29 and belt 30, the latter passing over a pulley 31 on one end of the motor-shaft 5. It will of course be understood that the shaft 28 will be provided with fast and loose pulleys and with a suitable belt-shifter, so that said shaft may be rotated only when required. As the plate 43 is reciprocated one receptacle therein will be in position to receive sand from the sand-box through the openings in plates 42 and 44 while the other receptacle 47 is discharging into the sand-tube 49, as clearly shown in Fig. 4.

17 designates the water-reservoir holding a supply of water to be used for cooling purposes. By combining with the motor-vehicle apparatus or tools requiring the use of hot water, as in the present example of my invention, when it is desirable or necessary to dry the sand, I am enabled to so circulate the water as to utilize both conditions. Thus, starting with cold water from reservoir 17, a pipe 36 leads to the jacket of the air-compressor 15, where the water is heated. A pipe 37 leads from the jacket of the air-compressor to the usual condenser or cooling-coil 32, where the water is cooled and then flows by pipe 33 to the jacket of the motor. After being here heated the water then flows by pipe 34 to the lowermost shelf 39 of the sand-box and thence by way of pipe 35 to reservoir 17. These several pipes will be provided with valves, as shown. In this way I alternately heat and cool the water, and during the course of its circulation both conditions are utilized. If desired, a small pump may be employed at any point to effect or assist the circulation of the water, or the circulating system may be arranged so as to effect the circulation by heat expansion, as shown.

In those operations in which it is desirable or necessary that the air should be dry I interpose in the pipe 50 an air-drying chamber 56, having perforations 57, Fig. 8, in the side wall adapted to be closed by a screw-cap. This chamber is filled by any suitable hygroscopic or moisture-absorbing material, through or over which the air is passed, so as to be thoroughly dried before delivery.

Instead of a sand-blast the compressed air may be utilized to furnish power for other industrial purposes above enumerated, in which case the special tools or apparatus required may be conveniently transported on the vehicle and will be varied according to the particular work to be done, it being borne in mind that the special object of the invention is to provide means whereby the motor may be used for power purposes when not used to propel the vehicle.

18 designates the fluid-fuel tank should gasolene be used, said tank being secured to the vehicle-frame in any well-known manner.

Instead of driving the air-compressor by the means shown I may employ a system of fast and loose pulleys connected by belt to the fly-wheel.

What I claim, and desire to secure by Letters Patent, is—

1. In a motor-vehicle the combination with the driving-gear thereof, of a motor, an air-compressor carried by the vehicle-frame, means to throw said motor into operative connection with either said driving-gear or said air-compressor, a sand-blast apparatus comprising a sand-tube extending into a pipe leading from the air-compressor and means actuated by said motor to deliver sand to said tube, substantially as described.

2. In a motor-vehicle the combination with the driving-gear thereof, of a motor, an air-compressor carried by the vehicle-frame, means to throw said motor into operative connection with either said driving-gear or said air-compressor, apparatus carried by the vehicle-frame and connected to said compressor to utilize the compressed air, and an air-drying chamber interposed in such connection, substantially as described.

3. In a device of the class described, a traction-vehicle, a motor, an air-compressor, a sand-box, means for drying the sand, an aspirator in communciation with the compressed-air supply and with the sand-supply, and shifting mechanism by which the motor may be allowed to run free or be brought into connection either with the traction-wheels of the vehicle or with the air-compressor, the motor when in connection with the traction-wheels being out of connection with the air-compressor and vice versa.

4. In a device of the class described, a traction-vehicle, a motor, an air-compressor, an air tank or reservoir in communication with the air-compressor, a sand-box, means for drying the sand, an aspirator in communication with the compressed-air supply and with the sand-supply, and shifting mechanism by which the motor may be allowed to run free or be brought into connection either with the traction-wheels of the vehicle or with the air-compressor, the motor when in connection with the traction-wheels being out of connection with the air-compressor and vice versa.

5. In a device of the class described, a traction-vehicle, an explosive-vapor motor, a water-jacket for the motor, an air-compressor, a water-jacket for the air-compressor, a water-tank, a sand-drier, an aspirator in communication with the sand-drier and the air-compressor, and means for causing a constant circulation of water through the water-tank, air-compressor water-jacket, sand-drier, and motor water-jacket.

6. In a device of the class described, a traction-vehicle, an explosive-vapor motor, a water-jacket for the motor, an air-compressor, a water-jacket for the air-compressor, a water-tank, a sand-drier, an aspirator in communication with the sand-drier and the air-compressor, a condenser, a pipe leading from the water-tank to the water-jacket of the air-compressor, a pipe leading from the air-compressor water-jacket to the condenser, a pipe leading from the condenser to the sand-drier, a pipe leading from the sand-drier to the water-jacket of the motor, and a pipe leading from the water-jacket of the motor to the water-tank.

7. In a device of the class described, a traction-vehicle, an explosive-vapor motor, a water-jacket for the motor, an air-compressor, a water-jacket for the air-compressor, a water-tank, a sand-drier, an aspirator in communication with the sand-drier and the air-compressor, a condenser, and circulating-pipes connecting the water-tank, air-compressor water-jacket, sand-drier, and motor water-jacket in a closed circuit so as to cause a circulation of water to and from the water-tank therethrough.

EDWARD MAY CAFFALL.

Witnesses:
JOHN McANDREW,
EDWARD W. SEARING.